(12) United States Patent
Copeland et al.

(10) Patent No.: US 9,008,907 B2
(45) Date of Patent: Apr. 14, 2015

(54) INTELLIGENT VEHICLE POWER CONTROL SYSTEM AND METHOD

(71) Applicants: Hugh D Copeland, Chula Vista, CA (US); Dan R Matthews, Gilbert, AZ (US)

(72) Inventors: Hugh D Copeland, Chula Vista, CA (US); Dan R Matthews, Gilbert, AZ (US)

( * ) Notice: Subject to any disclaimer, the term of this patent is extended or adjusted under 35 U.S.C. 154(b) by 48 days.

(21) Appl. No.: 13/907,518

(22) Filed: May 31, 2013

(65) Prior Publication Data
US 2014/0358367 A1 Dec. 4, 2014

(51) Int. Cl.
H02J 7/14 (2006.01)
B60R 16/03 (2006.01)
G01R 31/00 (2006.01)

(52) U.S. Cl.
CPC ..................... B60R 16/03 (2013.01)

(58) Field of Classification Search
CPC ......... H02J 7/0031; H02J 7/0032; H02J 9/02; G01R 31/00; H01H 1/00
USPC .......... 701/36, 22, 1; 320/140, 136; 307/10.1, 307/10.7; 340/540
See application file for complete search history.

(56) References Cited

U.S. PATENT DOCUMENTS

| | | | |
|---|---|---|---|
| 3,374,394 A | 3/1968 | Miller | |
| 3,395,288 A | 7/1968 | Von Brimer | |
| 3,474,296 A | 10/1969 | Rickey | |
| 3,723,752 A | 3/1973 | Russell | |
| 4,088,940 A | 5/1978 | Ciarniello et al. | |
| 4,137,557 A | 1/1979 | Ciarniello et al. | |
| 4,218,717 A | 8/1980 | Shuster | |
| 4,493,001 A | 1/1985 | Sheldrake | |
| 4,864,154 A | 9/1989 | Copeland et al. | |
| 4,902,956 A | 2/1990 | Sloan | |
| 5,089,762 A | 2/1992 | Sloan | |
| 5,136,230 A | 8/1992 | Gayler | |
| 5,140,250 A | 8/1992 | Morland | |
| 5,159,257 A | 10/1992 | Oka et al. | |
| 5,200,877 A | 4/1993 | Betton et al. | |
| 5,272,386 A | 12/1993 | Kephart | |
| 5,321,389 A | 6/1994 | Meister | |
| 5,332,958 A | 7/1994 | Sloan | |
| 5,691,619 A | 11/1997 | Vingsbo | |
| 5,693,986 A * | 12/1997 | Vettraino et al. | 307/10.7 |
| 6,442,702 B1 | 8/2002 | Ishikawa et al. | |
| 6,598,168 B1 | 7/2003 | Chen | |
| 6,753,625 B2 | 6/2004 | Kelsey | |
| 6,920,580 B1 | 7/2005 | Cramer et al. | |
| 7,107,472 B2 | 9/2006 | Weinold | |
| 7,116,078 B2 | 10/2006 | Colombo et al. | |
| 7,129,598 B2 | 10/2006 | Wagner et al. | |
| 7,173,347 B2 * | 2/2007 | Tani et al. | 307/10.1 |
| 7,254,811 B2 | 8/2007 | Kouznetsov et al. | |
| 7,508,091 B2 | 3/2009 | Binder | |
| 7,802,115 B2 | 9/2010 | Tsai | |
| 7,911,080 B2 | 3/2011 | Turski et al. | |

(Continued)

Primary Examiner — Tan Q Nguyen

(57) ABSTRACT

The present disclosure provides a system and method for managing a vehicle electrical system providing power to auxiliary systems. The system comprises a power control device with the ability to control the power to multiple auxiliary systems. The device has one or more sensor inputs for reading the system voltage and other data. The device can be configured with preset voltage thresholds for turning individual accessories on or off at predetermined voltage levels, or otherwise entering shutdown procedures. The system may also comprise a computer that is running dedicated software for managing the system and reconfiguring the device behavior.

23 Claims, 10 Drawing Sheets

(56) References Cited

U.S. PATENT DOCUMENTS

| | | | |
|---|---|---|---|
| 8,030,881 B2 * | 10/2011 | Owens et al. | 320/104 |
| 8,151,124 B2 | 4/2012 | Lee | |
| 8,174,382 B2 | 5/2012 | Kilmurray et al. | |
| 8,188,704 B2 * | 5/2012 | Reese et al. | 320/104 |
| 2001/0040441 A1 | 11/2001 | Ng et al. | |
| 2004/0232769 A1 * | 11/2004 | Pickering | 307/10.1 |
| 2005/0285445 A1 * | 12/2005 | Wruck et al. | 307/10.1 |
| 2007/0188150 A1 | 8/2007 | Yamaguchi et al. | |
| 2011/0282526 A1 * | 11/2011 | Mirle | 701/22 |

* cited by examiner

INTELLIGENT VEHICLE POWER CONTROL SYSTEM AND METHOD

BACKGROUND

The present application relates to a system and method for monitoring energy consumption of vehicle electrical systems, and more particularly, limiting the power consumption of vehicle auxiliary systems.

Many vehicles—particularly service vehicles such as police cars, emergency vans, taxis, tow trucks, wrecking trucks, fire engines and the like—contain auxiliary systems that are designed and used for a specific purpose, including computers, dispatch two-way radios, computerized dispatch systems, GPS and public address systems. These auxiliary systems typically derive power directly from the vehicle battery, bypassing the vehicle ignition protocol, which allows the systems to be utilized even when the vehicle is turned off. Because of this configuration, it is not uncommon for such auxiliary systems to be left on at the end of the day when the vehicle is parked and the operator goes off duty. For example, a public address system on a vehicle may be quietly idling; a two-way radio may be silent; or a computer system may be active. Because of the foregoing, it is not uncommon for an operator to find that the battery of his or her vehicle has been completely drained of power when he or she returns after a weekend. The vehicle must then receive a jump start before it can be used. If a computer system is installed, the unexpected loss of power can result in loss of data and cause system crash requiring a technical service call. Even in the field of use a vehicle can be left unattended and its electrical systems left on and draining the battery, potentially leaving the operator stranded in a remote location.

Currently available solutions are generally aimed at battery protection and do not adequately provide for system data preservation. Further, many of these systems do not provide for situations where excess power is available, such as when the vehicle is receiving a jump-start. Meanwhile, the auxiliary systems in the current field continue to become more sophisticated. For example, these systems may utilize 12V, 24V, or 48V power. Some service vehicles may be hybrid vehicles or electric vehicles, which may contain high voltage power.

Thus, there remains a need for a system and method for managing vehicle electrical systems that provide intelligent power control to improve the performance and life of all vehicle systems.

SUMMARY

The present disclosure provides a device, system, and method for managing the distribution of power in a vehicle electrical system to auxiliary devices, such as, for example, computer systems, communication systems, audiovisual equipment, or the like. In particular, the present disclosure provides intelligent control of the power distribution, controlling individual auxiliary systems independently.

In comparison with currently available solutions, the present disclosure is intended to offer a more sophisticated solution to protecting a vehicle computer, the vehicle battery, such as to anticipate the needs of the user allowing for aggressive use of the battery which decreases battery life but allows for more energy to be made available, or alternatively one can choose a cautious profile which can allow for longer battery life or less maintenance and where these features are changeable by software implemented on the vehicle PC and profiles and actions can be managed and altered on the fly as needed. In some examples, the system and method of the present disclosure may be adapted and configured to a wide range of installations including automobiles, utility vehicles such as tow trucks, large load haulers and construction vehicles, electric vehicles including but not limited to forklifts and electric load carrying vehicles, as well as military and emergency responsive vehicles which can be heavily accessorized and therefore greatly benefit from more sophisticated power management, and other vehicles where optional accessories might benefit from power source management and interaction and warning preceding shutdown to protect system integrity. The sophisticated system disclosed herein can make data more widely available between systems by processing and displaying data about power usage, system power status, individual component state, and vehicle state and location. Further, user requirements and data points all can be made available through hardware and application interfaces. This disclosure is intended to support systems that change and evolve and allows for the possibility of re-configuration, as well as algorithm and system update through integrated communications channels.

Other systems, methods, features, and advantages of the present disclosure will be or become apparent to one with skill in the art upon examination of the following drawings and detailed description. The features, functions and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Figure 1:
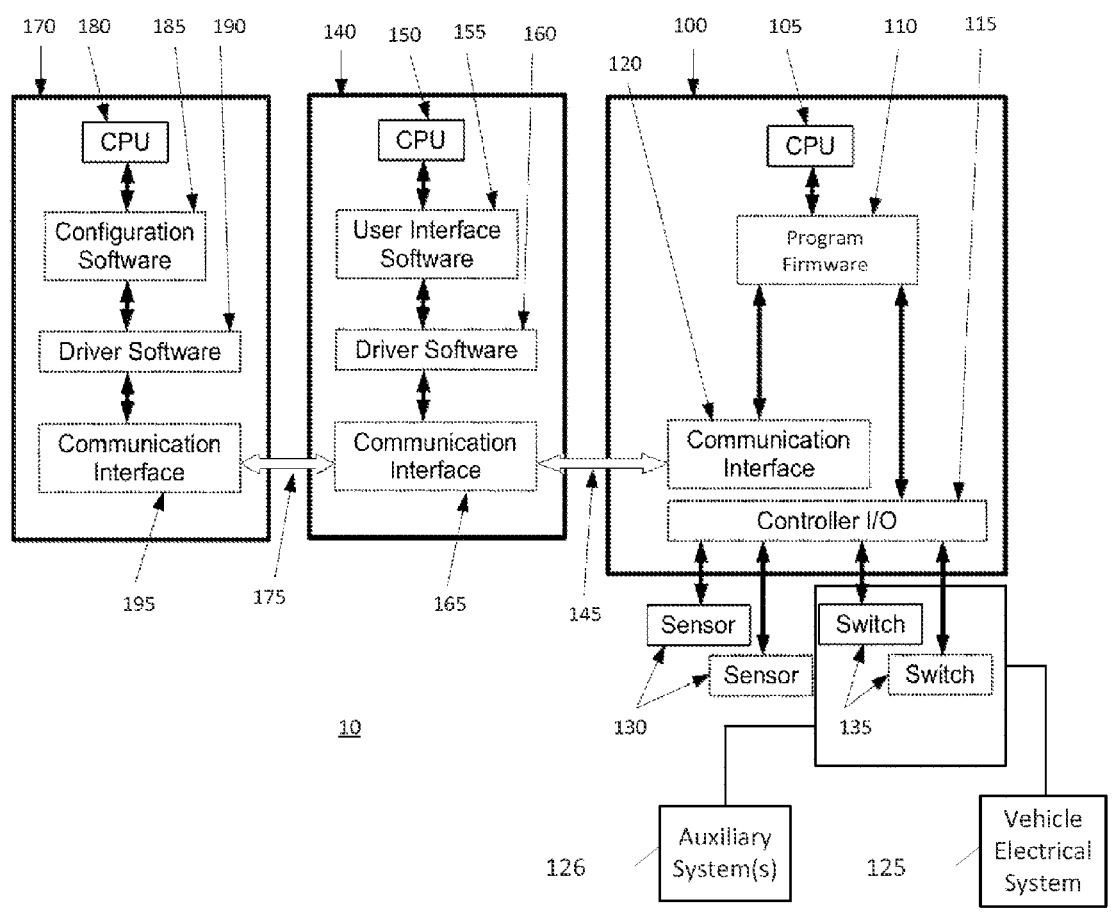
FIG. 1 is a schematic depicting one embodiment of a power control system in accordance with the present disclosure.

FIG. 1 illustrates one embodiment of a power control system 10 in accordance with the disclosure. In the illustrated embodiment, the power control system 10 comprises a power control device 100, a first computer system 140, and a second computer system 170. The power control device 100 comprises a processor 105, program firmware 110, a controller input/output (I/O) unit 115, and a communications interface 120. The controller I/O unit 115 is connected to one or more sensors 130 and one or more switches 135. The switches 135 may, for example, be used to relay power from a vehicle electrical system 125 to one or more auxiliary systems 126. The first computer system 140 comprises a processor 150 which executes a user interface software 155 and a driver software 160. The first computer system 140 further comprises a communications interface 165 that communicates with the communication interface 120 of the power control device 100 via a first communications medium 145. The second computer system 170 comprises a processor 180 which executes a configuration software 185 and a driver software 190. The second computer system 170 further comprises a communications interface 195 that communicates with the communication interface 165 of the first computer system 140 via a second communications medium 175.

The present disclosure provides a vehicle power control system 10, which employs a processor-based power control device 100. The power control device 100 includes a processor 105 that may comprise, for example, an ASIC, microcontroller or other microprocessor based circuit that utilizes analog to digital conversion to read the vehicle system voltage and makes decisions about turning on and off auxiliary systems. In one embodiment the power control device 100 is powered by the vehicle electrical system 125 and therefore has access to the system voltage from its power input. The power input can be connected to an analog to digital converter (ADC) input and the device 100 could optionally have a voltage reference whereby the ADC input is compared to the reference and the ratio of the unknown vehicle voltage to the known reference allows the unknown value to be calculated by the processor 105 using traditional methods.

The Power control device 100 can control power to one or more auxiliary systems 126 by means of one or more switches 135. The switches 135 may, for example, comprise one or more bipolar transistors, MOSFETS or relays. Some embodiments may be configured to disconnect power from the vehicle electrical system 125 using the switches 135 when the battery voltage level is nearing depletion.

Turning again to FIG. 1, the power control device 100 is installed in a vehicle. The processor 105 executes program firmware 110 for processing input, communication protocol, and controlling switch outputs. The processor 105 interprets the data generated by the sensors 130 and controls the states of the switches 135 for powering connected auxiliary systems 126, such as radio, lights, siren, computer, GPS and other electrical devices installed in the vehicle. The controller I/O unit 115 may comprise pins for interfacing with the sensors 130 and switches 135. The power control device 100 has a communications interface 120 to interface with other computer systems for reading data from the processor 105 or updating the program firmware 110. The communications interface 120 may comprise SPI, IIC, USB, RS232, RS485, Ethernet, Wi-Fi, Bluetooth or other communications interface type. The processor 105 may be connected to sensors 130 for determining voltage, current, temperature or other analog system levels. These levels are considered in execution of the program firmware 110 in determining whether to turn on or off switches 135 for activating or deactivating loads resulting from connections to various auxiliary systems 126. Each switch 135 may comprise a MOSFET, bipolar transistor, hall effect switch, relay or other switching mechanism.

Figure 1A:
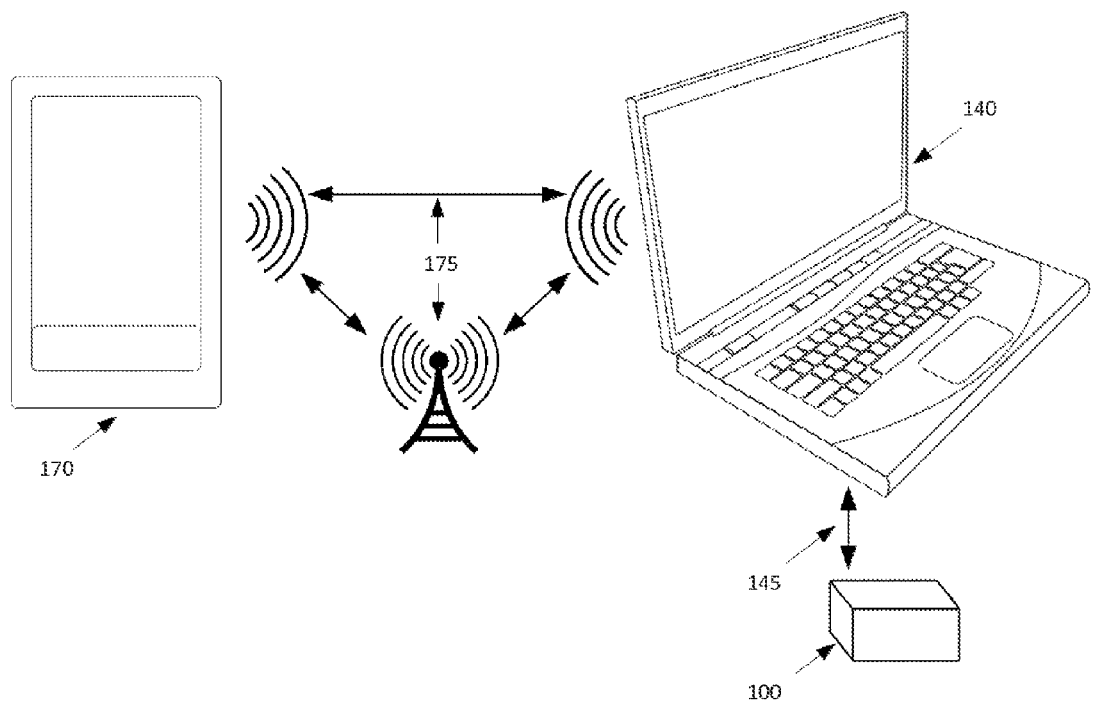
FIG. 1A is a schematic depicting another embodiment of a power control system in accordance with the present disclosure.

One example configuration is illustrated in FIG. 1A, wherein the power control device 100 is connected to a first computer system 140, which may comprise a laptop computer as shown, via a communications medium 145. In some examples, the first computer system 140 may further comprise a user interface. The first computer system 140 is also in communication with a second computer system 170, which is shown as a smart phone acting as a guest computer device, via a second communication medium 175. In FIG. 1A, communications medium 175 is depicted as a wireless connection which may be bidirectional between the first computer system 140 and the second computer system 170 and may include an indirect route, such as a cellular phone network or other wireless network or cloud.

In some examples, the vehicle power control system 10 provides a user interface that can be incorporated into the first computer system 140, the power control device 100, or separately installed and implemented. Alternatively, a separate user interface may be provided that communicates with either the first computer system 140, or directly with the power control device 100. The user interface may comprise any device which communicates information to the user, such as one or more LEDs, LCD screens, buzzers or other output devices. When the user interface comprises a separately installed computer, it can provide a more sophisticated control algorithm, which can more easily include complex input, for instance such as GPS location data to determine if the vehicle is parked in its storage location or if it is in the field. The power control device 100 can be connected through the PC to dispatch devices or other vehicle sensors via a communications interface 165 or other device.

In some embodiments, the program firmware 110 may comprise flash or other writable memory. The first computer system 140, or host computer, can be configured to upload new firmware to the power control device 100 via the connection medium 145. Where the first computer system 140 and the power control device 100 are combined, such as where both are contained on the same printed circuit, the connection medium 145 may comprise traces. Alternatively, where the first computer system 140 and the power control device 100 are separate devices, but contained within a single enclosure, the connection medium 145 may comprise connectors or wires or other interconnection means. In any case, including where the power control device 100 and the first computer system 140, or host computer, are in separate enclosures, the devices may be connected by numerous methods, including cabling or two way wireless transmission such as Wi-Fi or Bluetooth.

The sensors 130 of the power control device 100 may be configured to measure one or more performance characteristics of the electrical system 125, or environment. These performance characteristics may include, for example, operating voltage, system temperature, electric current from the vehicle electrical system 125 to the power control device 100, electric current going to individual auxiliary systems 126, capacity of auxiliary system battery, vehicle ignition state, open/closed state of switches 135, and the like. In some systems, the sensors 130 are configured to measure performance characteristics that not only indicate the performance of the primary electrical system 125, but also indicate the performance of the power control device 100 and/or the auxiliary devices 126, including the host computer 140.

The user interface may be used to process commands for configuration, user preferences or to provide control to the user. For example, the user interface software 155 on the first computer system 140, which may comprise, for example, a laptop PC installed in the vehicle, communicates with the power control device 100 and provides system status feedback to the user, which may, for example, warn of low battery or over-load conditions and impending shut down status. The user may be allowed to delay or "snooze" shut down or the user can be offered a chance to exit open applications before the system shuts down to save battery life.

When the power control system 10 is configured to provide intelligent feedback to the power control device 100, such as a change in a predetermined value representing a critical state or for providing a command, driver software 160 may be needed to process commands received via the user interface software 155. Such an input may be represented, for example, by a button click, and may be translated into an appropriate action or command and sent to the power control device 100, such as requesting a delay of shut down for a specified time period.

A list of commands that may be available via the user interface may include, but is not limited to, the following commands: Shutdown power for all systems off now; Shutdown power for all systems off after a fixed time; Turn on or off a specific power point; Pause any pending shutdown (for urgent/over-riding local priority); Report current system status; Log System data, including selecting sensors, and time rate of sample for any measured performance characteristic, including system voltage, ignition state, battery states, power point usage, and the like.

In some embodiments, one or more communications interfaces 120, 165, 195 can be implemented to exchange data with the power control device 100 or with another system, such as the host computer 140, for configuration, update management, or monitoring of data. The communications interface 120, 165, 195 may comprise SPI, IIC, USB, RS232, RS485, Ethernet, Wi-Fi, Bluetooth or other communications interface type.

In some examples, a second computer system 170, such as a guest computer, or remote user interface can be used to connect to the power control device 100. The second computer system 170 may be used to issue commands, such as, for example, overriding the power control device 100 or activating or deactivating a specific auxiliary system 126. The second computer system 170 may also be used to monitor any of the performance characteristics measured by the sensors 130 and/or computed by the processor 105. The second computer system 170 may also be used to log this information in a database.

In some embodiments, the vehicle power control system 10 may include firmware or software that can be updated or reconfigured. Configuration settings and changes can be made within the local power control device 100, from the user interface, or from yet another system such as a remote PC or other guest computer, such as second computer system 170, acting as a configuration system and communicating data or commands via printed circuit traces, wires, other communications means or a network connection. For example, a technician might use the second computer system 170 to update the program firmware 110 in the locally installed power control device 100 in the vehicle by downloading an update to the first computer system 140 in the vehicle which is then passed along to the power control device 100 for writing to its local memory.

A technician or user might also use the second computer system 170 to query the first computer system 140 or the power control device 100 as to its status. If the configuration and/or updating is performed remotely, the power control system 10 might be intelligently controlled via the second computer system 170, which may comprise be any type of personal computing device, executing separate configuration software 185 for managing configuration or update. These features may alternatively reside within the first computer system 140, which may further be combined with the power control device 100. When the configuration and/or update is managed outside of the local power control device 100 installed in the vehicle, a separate configuration software 185 can be installed in the second computer system 170. A technician might be required to provide adequate credentials, such as but not limited to user name, password, fingerprint or other biometric data, security card and/or other token of approved access. The second computer system 170, or guest computer, could also be used to maintain the first computer system 140, or host computer, keeping its installed software, configuration and drivers up to date. Driver software 190 may be used to translate commands issued for configuration and/or update into specific tokens or packets to be passed along to the first computer system 140 and/or along to the power control device 100 installed in the vehicle.

Figure 2:
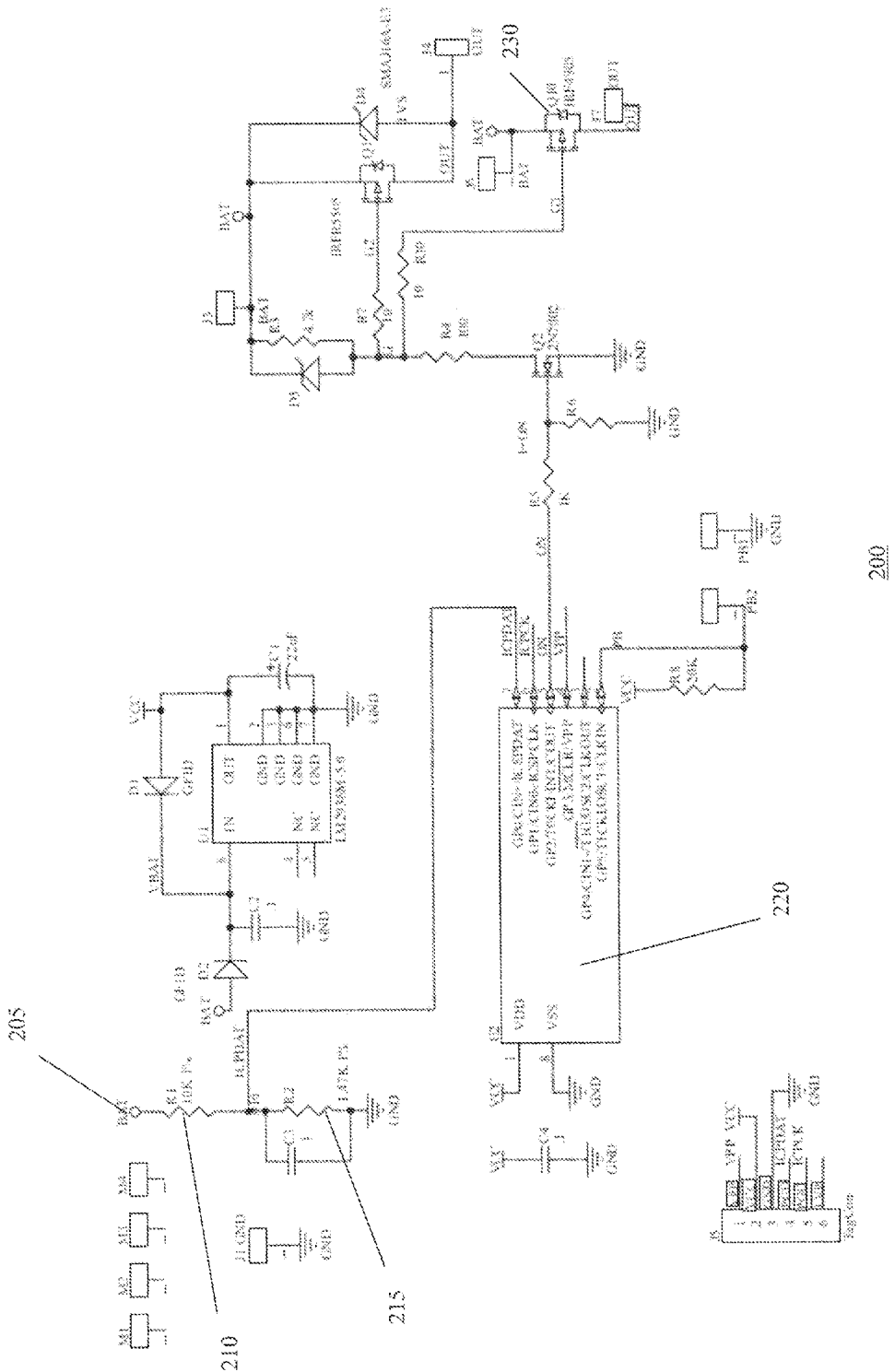
FIG. 2 is an electrical schematic depicting one embodiment of a power control device of the present disclosure.

FIG. 2 illustrates a circuit diagram of one exemplary embodiment of a power control device 200. In the illustrated embodiment, the power control device 200 is installed in a vehicle and controls a single load switch 230 and is capable of communicating to a host computer and/or guest computer. The switch 230 may comprise a power MOSFET, as shown, with its gate controlled by an I/O pin of a processor 220. Resistors 210 and 215 provide a series resistor divider between the power control device 200 and the vehicle electrical system 205. The vehicle electrical system 205 may be fed into an input on the processor 220, allowing the processor 220 to determine system status, when the vehicle is running and charging, or battery voltage when the vehicle is not running. The processor 220 can be chosen such that its internal firmware memory is a writable flash or EEPROM type, such that the device could update its own firmware or configuration settings, such as, for example, low battery thresholds and shutdown timer values. If connected to a user interface or to a computer system with configuration capability, the power control device 200 can have its settings changed by external command or have its entire firmware updated with data downloaded via a communications interface.

Example thresholds include, but are not limited to: Over normal operating voltage; Over safe operating voltage; Set profiles to allow aggressive battery use, high charge discharge, but shorten life; Set profiles to prioritize battery life and cost of maintenance dependent on installed systems and intended use; Time permitted over normal operating voltage but less than maximum safe operating voltage; Time permitted under normal operating voltage but greater than minimum safe operating voltage; Amount of time when a shutdown even can be delayed; Amount of time to allow user to delay; Amount of time before user delay request is over-ridden and system shuts down anyway; Normal charge state of battery charge for controlling PC; etc. Individual thresholds may be configured to be input by the user. Alternatively, the user may be prevented from changing some thresholds. Thresholds may be set with respect to individual auxiliary systems based on priority, usage, the presence of a battery, or other criteria. Each of these thresholds may comprise an upper threshold value and a lower threshold value, thereby forming a range.

Further, additional thresholds may be set to customize the control scheme of the power control device 100. For example, the system voltage may have non-critical and critical thresholds set for each individual auxiliary system 126. When a non-critical threshold is met, (i.e., crossed or exceeded thereby indicating that a measurement above, below, or outside a normal operating range), the power control device 100 may be configured to start a shutdown timer associated with a particular auxiliary system 126, at the expiration of which the auxiliary system 126 would be shut down. The system 10 may further be configured to allow the user to issue a command to temporarily disable the shutdown or to execute the shut down immediately. The system 10 may also be configured to discontinue the shutdown timer and restore power to the auxiliary system 126 when the measured characteristic returns to a value within a normal range.

The shut down or disconnect of an auxiliary system 126 may be programmed to coincide with a particular auxiliary system 126. For example, an auxiliary system 126 with no internal battery may be shut down with or without a delay to allow the auxiliary system 126 to properly shut down. Auxiliary systems 126 with internal batteries may be disconnected immediately to relieve the electrical system 125, while that system 125 continues to operate under its own battery power.

Figure 3:
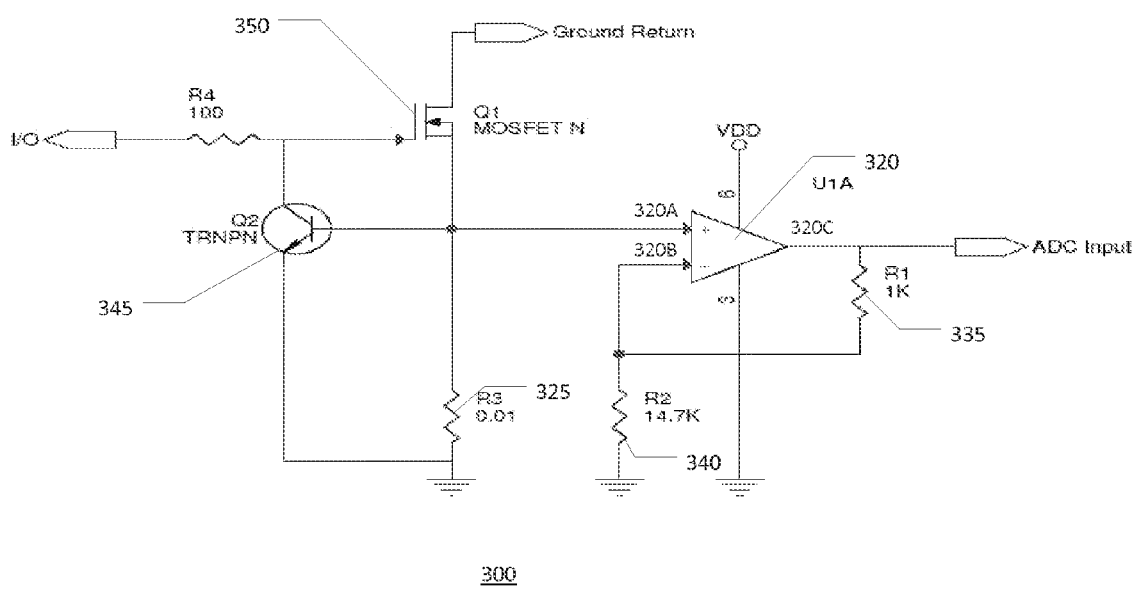
FIG. 3 is an electrical schematic depicting one embodiment of a sensor circuit of the present disclosure.

FIG. 3 illustrates one example of a sensor circuit 300 that may be provided as a part of the vehicle power control system 10 of the present disclosure. The illustrated sensor circuit 300 allows the power control device 100 to measure the current consumption of the connected auxiliary systems by allowing the current to pass through a resistor and by measuring the amplified voltage induced across that resistor. To limit the affect the resistor has on the vehicle electrical system, a very low resistance value may be used and the voltage induced across the resistor can be amplified.

In the illustrated example, resistor 325 is in series with the ground connection of load and the voltage across pin 320A of amplifier 320 is amplified and output on pin 320C of amplifier 320. The positive gain of the amplifier 325 is set by selection of resistors 335 and 340. Alternatively, a similar connection could be made with a series resistor on the supply side instead of the ground (return) side. Where, for example, the current is above 60 Amps, the voltage across resistor 325 may be 0.6V, which is enough to turn on transistor 345 and pull the gate on switch 350 low, thereby turning off the return path. This configuration creates a high speed, automatic over-current protection at 60 Amps. Such a configuration may be used to allow a processor some time to respond to the over-current condition.

In operation, the power control system 10 of the present disclosure may be used in connection with a method to manage a vehicle electrical system 125. Such a method may comprise the steps of connecting at least one auxiliary system 126 to the vehicle electrical system 125 with a power control device 100. The method also comprises measuring data that indicates and quantifies a power capability of the vehicle electrical system 125. When the power capability is at a critical level, the power control device may initiate a shut-down sequence for the auxiliary systems 126, or may terminate power immediately. If the power capability is outside of a normal range, a processor may determine a duration of time for which the vehicle power system 125 can continue to provide power to the auxiliary system 126, which duration of time may be calculated from data or may be a predetermined value. The power control device 100 is then used to measure the length of time that the power capability is outside the normal range using a timer. When the timer runs out, or reaches a value equal to the duration of time determined above, the power control device 100 initiates a shutdown sequence of at least one auxiliary system 126 or cuts power altogether. If, while the timer is running, the power capability returns to a value that is within the normal range, the timer is stopped and power continues to be supplied to the auxiliary systems 126. When multiple auxiliary systems 126 are involved, the normal range values, duration of time values, and critical range values may be changed separately for each auxiliary system 126, if desired. Further, the user may configure a prioritization whereby nonessential auxiliary systems 126 are shut down and important auxiliary systems 126 are kept running for a longer duration of time.

Figure 4:
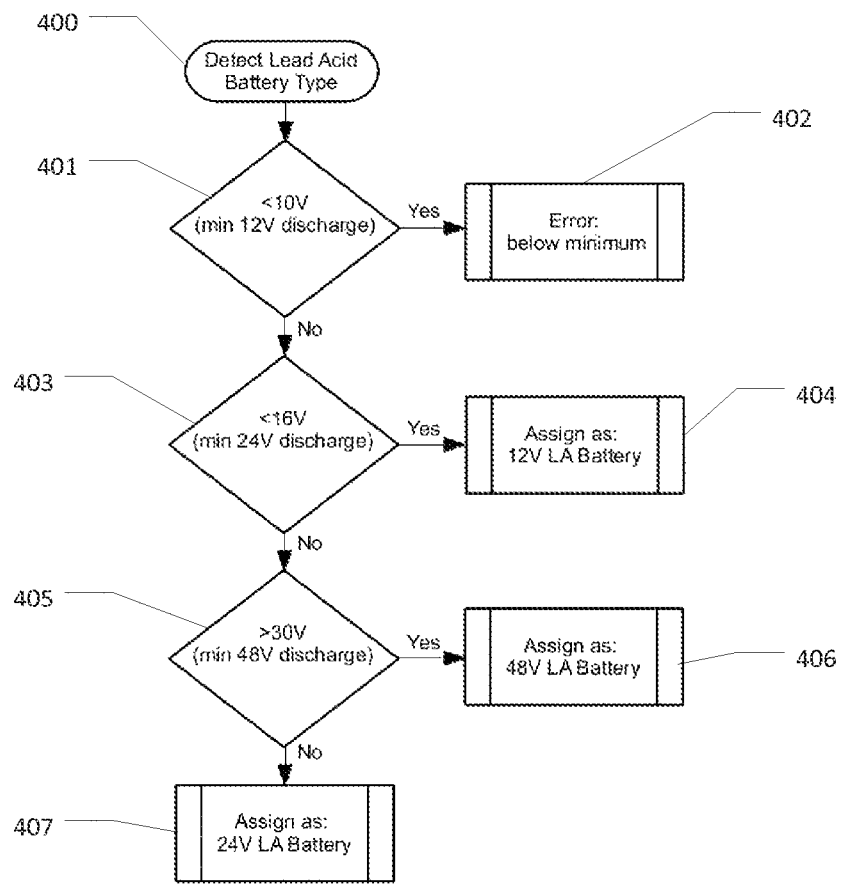
FIG. 4 is a flowchart depicting one embodiment of a method for detecting battery type.

FIG. 4 illustrates one embodiment of an algorithm 400 for detecting battery type, when the battery type is unknown to start, for instance at installation, and then could optionally be determined by way of a series of voltage and optionally temperature and load measurements. As can be seen from Table 1, below, 12V lead acid batteries operate from approximately 10V to 15V, 24V lead acid batteries operate between approximately 20V to 30V, and 48V lead acid batteries operate between approximately 40V to 60V. Note that there is no overlap in these ranges. Therefore, the initial measurement need only determine which range the vehicle is operating within and then utilize those thresholds appropriate for that voltage battery.

The illustrated algorithm 400 comprises a first step 401 of determining whether the discharge is less than 10V. If the voltage is below 10V, for example, the algorithm 400 returns an error message 402. Next, the algorithm 400 provides the step 403 of determining whether the discharge is less than 16V. If the voltage is less than 16V, the algorithm 400 determines 404 that the battery is a 12V lead acid battery. If greater than 16V, the algorithm 400 next performs step 405 to determine whether the discharge is greater than 30V. If the discharge is greater than 30V, the algorithm 400 determines 406 that the battery is a 48V lead acid battery. If the discharge is not greater than 30V, (but is greater than 16V), the algorithm 400 determines 407 that the battery is a 24V lead acid battery.

Table 1, below, lists a number of example thresholds that, if programmed into the power control device 100, could allow the program firmware to determine whether a 12V, 24V or 48V lead acid battery is installed in the vehicle power system. This self-determination would allow a user of the power control device 100 to stock only one kind of device for all three battery types, thus simplifying device purchase and installation.

TABLE 1

| Battery Condition @ 77° F. | Nominal Battery Voltage | | |
|---|---|---|---|
| | 12 V | 24 V | 48 V |
| Battery during equalization charge | Over 15 | Over 30 | Over 60 |
| Battery near full charge while charging | 14.4 to 15.0 | 28.8 to 30.0 | 57.6 to 60.0 |
| Battery near full discharge while charging | 12.3 to 13.2 | 24.6 to 26.4 | 49.2 to 52.8 |
| Battery fully charged with light load | 12.4 to 12.7 | 24.8 to 25.4 | 49.6 to 50.8 |
| Battery fully charged with heavy load | 11.5 to 12.5 | 23.0 to 25.0 | 46.0 to 50 |
| No charge or discharge for 6 hours-100% charged | 12.7 | 25.4 | 50.8 |

TABLE 1-continued

| Battery Condition @ 77° F. | Nominal Battery Voltage | | |
|---|---|---|---|
| | 12 V | 24 V | 48 V |
| No charge or discharge for 6 hours-80% charged | 12.5 | 25 | 50 |
| No charge or discharge for 6 hours-60% charged | 12.2 | 24.4 | 48.8 |
| No charge or discharge for 6 hours-40% charged | 11.9 | 23.8 | 47.6 |
| No charge or discharge for 6 hours-20% charged | 11.6 | 23.2 | 46.4 |
| No charge or discharge for 6 hours-Fully discharged | 11.4 | 22.8 | 45.6 |
| Battery near full discharge while discharging | 10.2 to 11.2 | 20.4 to 22.4 | 40.8 to 44.8 |

Figure 5:
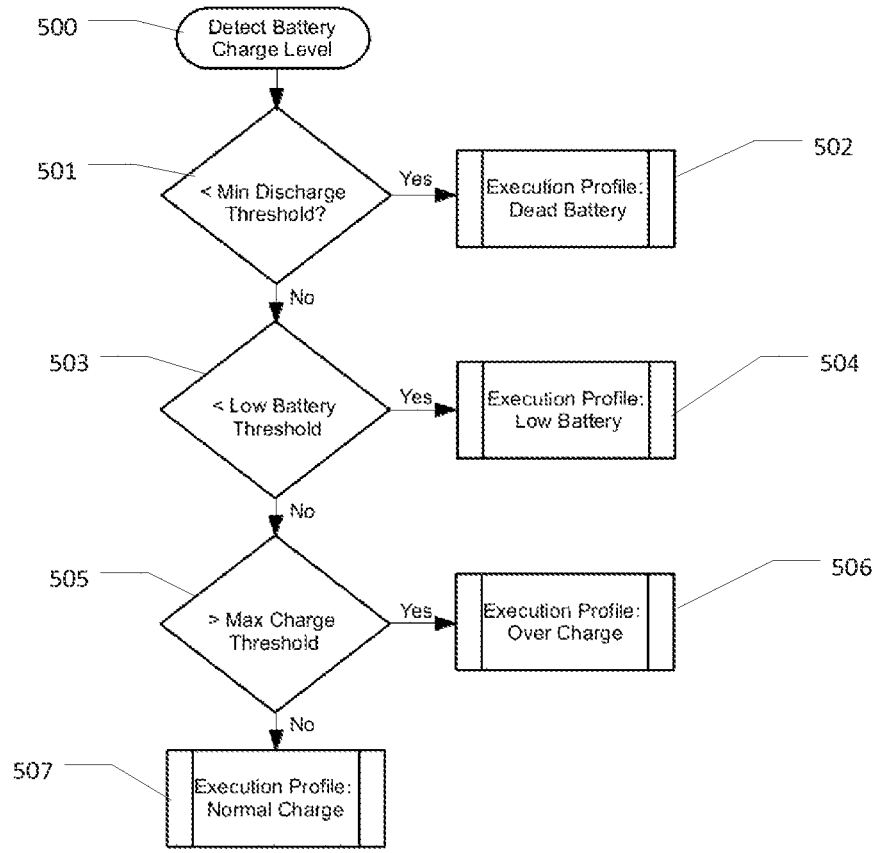
FIG. 5 is a flowchart depicting one embodiment of a method for detecting battery charge level.

FIG. 5 illustrates one example of another method 500, or subroutine, for detecting battery charge level. The method 500 provides a first step 501 of determining whether the charge level is less than the minimum discharge threshold. If yes, the method 500 results in execution profile 502, indicating a dead battery. Otherwise, the method 500 provides a second step 503 of determining whether the charge level is greater than a low battery threshold. If yes, the method 500 results in execution profile 504, indicating a low battery. Otherwise, the method 500 provides a third step 505 of determining whether the charge level is greater than a maximum charge threshold. If yes, the method 500 results in execution profile 506, indicating an over charge. Otherwise, the method 500 results in execution profile 507, indicating that the battery is at a normal charge level.

Figure 6:
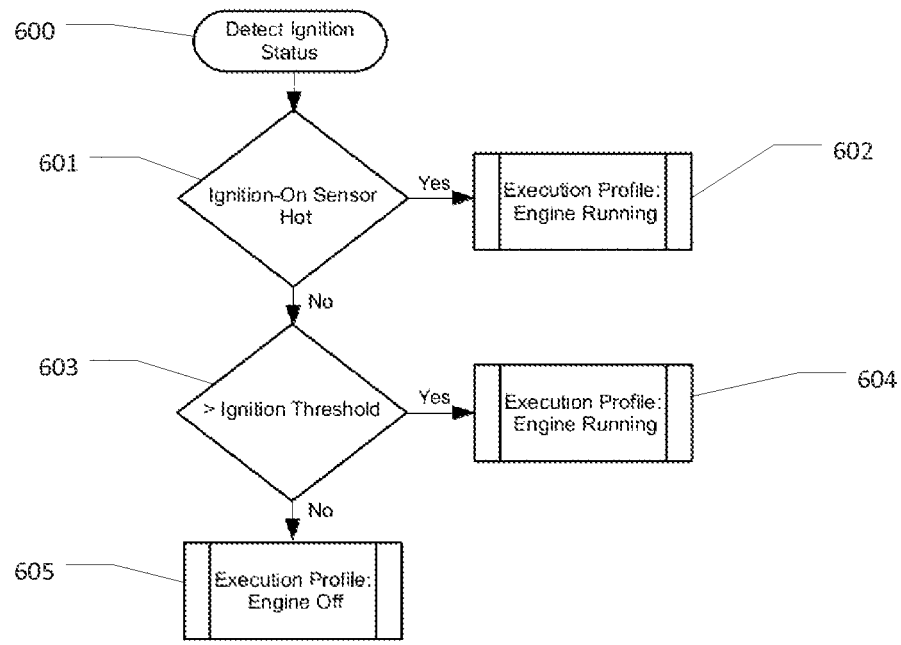
FIG. 6 is a flowchart depicting one embodiment of a method for detecting ignition status.

FIG. 6 illustrates one example of another method 600, or subroutine, for determining the ignition status of the vehicle. This method 600 comprises a first step 601 of determining whether the ignition is on, and a second step 603 of determining whether the sensors indicate that the ignition system meets a threshold value. For example, if the installer chooses to connect the ignition switch to a device input, the device would be able to determine whether the ignition switch is in the "run" position or "accessory" position. Additionally the power control device 100 of FIG. 1 could use one or more sensors 130 to determine the system voltage and compare this input to thresholds as described Table 1, above, to determine whether the vehicle is running and charging the vehicle battery, or whether the vehicle is off and dormant. If either step indicates the engine is running, the method 600 so indicates via execution profile 602 or 604, respectively. If the method 600 determines the engine is not running, the method 600 results in execution profile 605, indicating that the engine is off.

The run output provides the system voltage at its output when it the ignition switch is in the run position. If the ignition switch position conflicts with the battery voltage reading, for instance if the battery is heavily loaded to 11V but the ignition switch is ON, then it could be determined that the system is under exceptionally heavy load and, if so configured, one or more accessories could be turned off.

Figure 7:
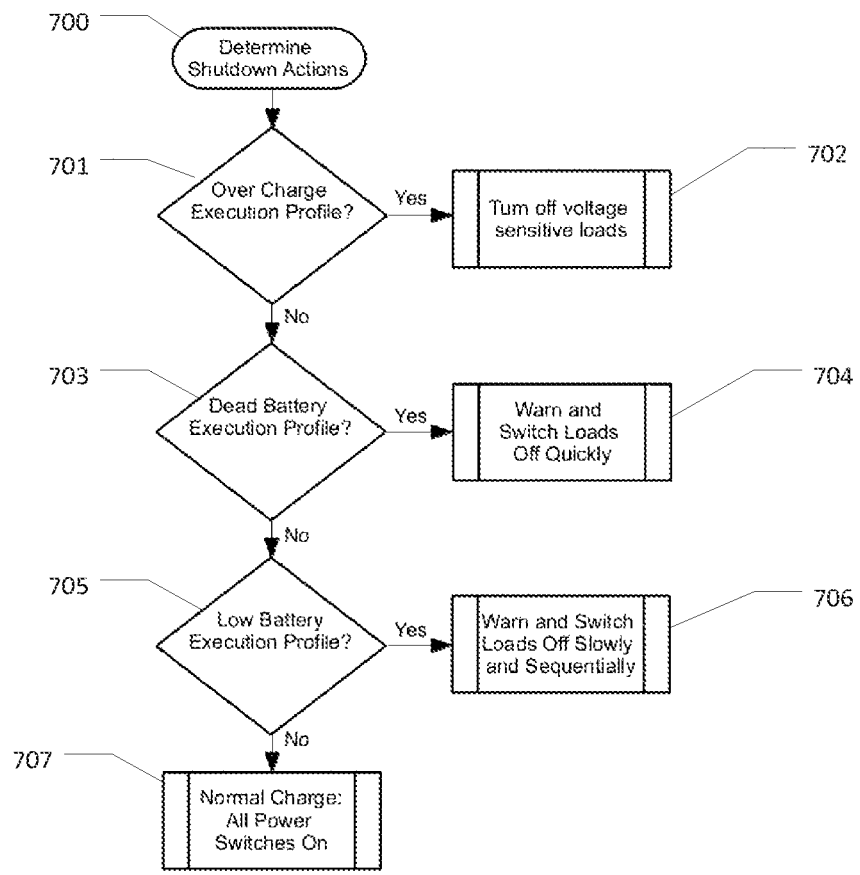
FIG. 7 is a flowchart depicting one embodiment of a method for determining shutdown actions.

FIG. 7 illustrates one example of a method 700 for determining shutdown actions. First, the method 700 provides a step 701 of determining whether the execution profile indicates that an over charge is true. If so, the method 700 provides a step 702 of turning off voltage sensitive loads. If not, the method 700 provides a step 703 of determining whether the execution profile indicates that a dead battery is true. If so, the method 700 provides a step 704 of warning the user and switching loads off quickly. If not, the method 700 provides a step 705 of determining whether the execution profile indicating a low battery is true. If so, the method 700 provides a step 706 of warning the user and switching loads off slowly and sequentially. If not, the method 700 provides the step 707 of continuing in normal operation, i.e., operating with all power switches on.

In application, the power control system may be configured to perform a shutdown sequence that is suited to a specific application. For example, the control device could optionally be configured to first "flash" the lights off periodically or send a short burst from the horn or an internally installed buzzer to warn of reduced battery capacity and to eventually warn of imminent shut down. The system could optionally send messages to a laptop, and software on the laptop could anticipate its impending shut down and send a warning message to the operator that shut down is imminent and, once data was saved, the system could then proceed to shut down. If the vehicle is unattended, the system could first issue warnings such as previously described or additionally or instead issue such software warnings as the PC is configured to provide, including but not limited to pop up messages with buttons allowing actions or dismissal. The PC can also be configured with user interface software to take necessary measures to attempt to close applications and save data for the operator before shutting down. If the vehicle is attended, the software could optionally provide a means to be delayed by way of a "snooze" button much like an alarm clock, and shutdown could be delayed for a period of time. The microcontroller on board the control device could manage all of the necessary voltage measurements, communication to the computer, counting down for shutdown time and switching off devices to save power.

As stated above, known voltage levels for specific battery types can be used to configure system control. For instance, these thresholds can be configured to detect over voltage conditions and allow the power control system to turn off one or more switches with devices attached whose input cannot withstand sustained exposure to such over voltage conditions. Lights, for example, can be much more tolerant to overvoltage conditions than sensitive computer equipment. Also, low voltages can cause computerized equipment to malfunction and motors to become damaged. Therefore, the power control device can be configured to associate specific threshold conditions with each individual auxiliary system.

Auxiliary systems can also be controlled in terms of priority. A high-power electric winch, for example, can be disabled unless the user starts the vehicle or a vehicle generator or other power back-up system to supply the needed energy to operate the high power motor. At the other extreme, a low-power laptop computer can be left turned on until the very lowest voltage setting is reached, and even then a command could be issued to the laptop computer to prepare for power disconnection. At that point, the laptop computer could determine by way of its internal software whether it has sufficient charge on its internal batteries to maintain operation, or whether it can execute its own shutdown procedure to prevent data loss prior to removal of power from the power control device.

In another example, the user interface software may be used to automatically trigger a request to pause the shutdown if it detects that the user is involved in a critical operation or if the user himself issues a request for a pause of shutdown. This shutdown pause could be for a pre-configured amount of time or chosen by the user. Again, in any of these embodiments, the power control system could refuse the user requested pause and remove power from switched power points as determined by its own program firmware control scheme.

In another example, a usage profile could be developed for the power control system. In some applications, for example, an aggressive energy policy might be employed, allowing higher than normal charge levels and greater than normal discharge use. It is known that battery life can be reduced through heavy discharge and fast charge, and conversely battery life can be extended by preventing deep discharge and high current charge. Such aggressive use levels might shorten the life of the battery and therefore increase maintenance costs. In certain applications, however, such as military field operations, allowing the maximum use of a battery or power system may be desired. In these situations, the power control system may allow the user to choose such an aggressive control scheme. Conversely, in other applications, such as a fleet vehicle setting, such as might be used in construction site inspection operations, the vehicle owner may wish to extend battery life as long as possible and thereby reduce down time and maintenance costs. In such non-mission-critical situations, a more cautious set of thresholds can be implemented. In these cases, lower battery limits can be made higher to keep more charge in the battery and increase its shelf life.

In some examples, thresholds can be implemented as defaults as set at manufacturing, or they can be altered by a user at a connected system that is authorized to over-ride its internal settings, such as the system shown in FIG. 1. Alternatively, another system, such as a smart phone or other external computer in a remote location, (as shown in FIG. 1A), could be used to request operations that, once validated, could be carried out by the local power control device. For example, a site inspector may use a smart phone to request a vehicle spotlight be turned off by way of a command from his or her smart phone to the host computer in the vehicle, which command is relayed to the power control device. In another example, a soldier in a military operation could radio a request to have infrared spotlights turned on from his or her vehicle to illuminate its immediate surroundings, and the command could be passed from a remote computer through a network to the vehicle laptop computer.

The configurable nature of the system disclosed in the present application provides intelligent control of local vehicle system accessory power, which can be invoked by local and remote computer systems or users, and can be over-ridden by determination of the local power control device, depending on previously configured thresholds and as updated by commands to change these thresholds.

Figure 8:
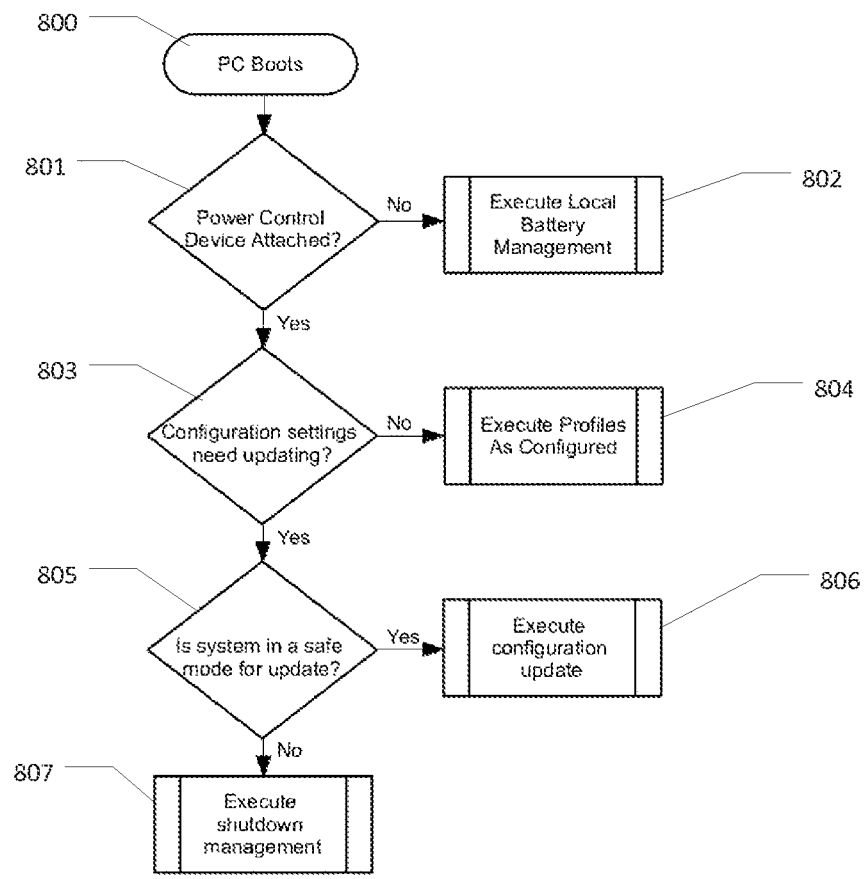
FIG. 8 is a flowchart depicting one embodiment of a method for booting a power control device.

FIG. 8 illustrates one example of a method 800 for booting a PC, connecting to and configuring the program firmware. The method 800 comprises a step 801 of determining whether the power control device is attached. If not, the method 800 provides the step 802 of executing local battery management. If the power control device is attached, the method 800 provides the step 803 of determining whether configuration settings need to be updated. If not, the method 800 provides the step 804 of executing the profiles as configured. If the configuration settings do need to be updated, the method 800 provides a step 805 of determining whether the power control system is in a safe mode for update. If so, the method 800 provides the step 806 of executing the configuration update. If the system is not in a safe mode for update, the method 800 provides a step 807 of executing shutdown management.

In some embodiments, the power control device is configured to look for an attachment or communications connection to a host computer or other computer device. If present, the PC is provided an opportunity to offer credentials that demonstrate its authority level to take control of the power control device output switches and to issue commands about turning said switches on or off. The PC could optionally be configured to pass commands from multiple software programs either through the user interface software or directly to the communications driver to be passed along to the power control device. For example, when a computerized dispatch unit is installed in a vehicle, such as might be found in a tow truck or taxi, the dispatch unit may be configured to request a pause of shutdown to allow itself time to properly power off. The user interface software or communications driver installed on the host computer connected to the power control device can be used to authorize or deny such connections to the power control device. These so-called "pass through clients" are enabled as described in the flowchart of FIG. 9.

Figure 9:
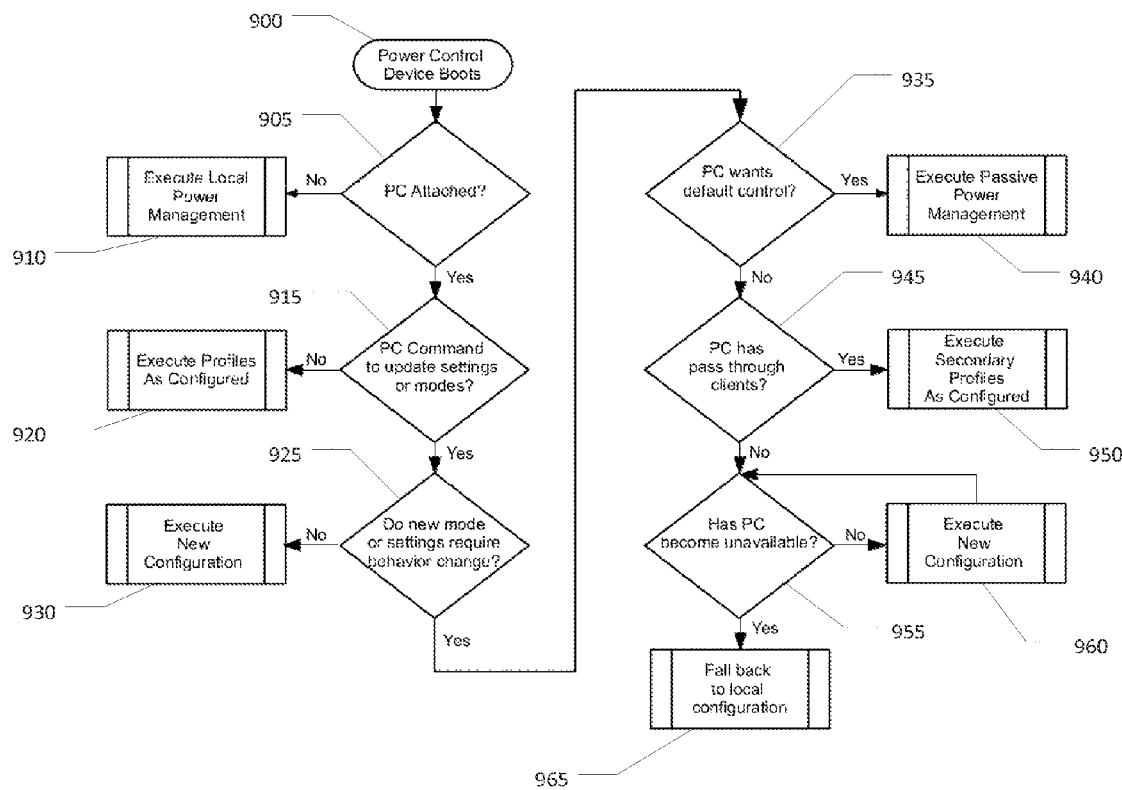
FIG. 9 is a flowchart depicting another embodiment of a method for booting a power control device.

Specifically, FIG. 9 illustrates an example method 900 for booting a power control device. The method 900 provides a step 905 of determining whether the personal computer (PC), or computing device, is attached to or otherwise in communication with the power control device. If not, the method 900 provides a step 910 of executing local power management protocol. If the PC is attached, the method 900 provides a step 915 of determining whether the PC has issued a command to update settings or modes. If the PC has not issued a command, the method 900 provides a step 920 of executing profiles as configured. If the PC has issued a command, the method 900 provides the step 925 of determining whether new mode or settings require a behavior change. If the new settings do not require the behavior change, the method 900 provides the step 930 of executing a new configuration. If the new mode or settings do require a behavior change, the method 900 provides the step 935 of determining whether the PC has requested default control. If so, the method 900 provides the step 940 of executing passive power management. If the PC has not requested default control, the method 900 provides the step 945 of determining whether the PC has a pass through client. If so, the method 900 provides the step 950 of executing secondary profiles as configured. If the PC does not have a pass through client, the method 900 provides the step 955 of determining whether the PC has become unavailable. If not, the method 900 provides the step 960 of executing the new configuration, i.e., the configuration requested by the PC. If the PC is unavailable, the method 900 provides the step 965 of falling back to local configuration, i.e., the previous configuration.

As discussed above, when the intelligent control devices, such as the host computer or another computing device, become unavailable, the power control device would resume full command of its output switches. The power control device would then use its sensor input and predefined thresholds and modes to make the determination as to which, if any, switches should be turned on or off.

The power control device of the present disclosure may have a connection to the vehicle computer by way of its communication bus, such as CAN bus or LIN bus, that communicates with the vehicle computer. In some embodiments, the power control device is connected directly to the vehicle power and has one or more switches, which are also connected to vehicle power. These switches have a connection point for device power attachment which allows these devices to turn on or off the power being supplied to the power control device itself.

The present disclosure provides numerous benefits over the currently available solutions, including the ability to automatically power down all systems within a certain time period, eliminate unnecessary service calls for dead batteries drained by auxiliary systems that are left on, improved battery life, reduced need for additional battery storage, reconfigurable power control systems, monitoring health of power control systems via user interface, prevention of data loss due to unexpected loss of power, low-voltage and overcharge detection, prioritization of auxiliary systems, and many other advantages which may be apparent to those in the art.

It should be emphasized that the above-described embodiments are merely possible examples of implementations and merely set forth for a clear understanding of the principles of the disclosure. Many different embodiments of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

What is claimed is:

1. A power control device for a vehicle, comprising:
   at least one power input configured to receive a first electric current from a vehicle electrical system;
   at least one power output configured to deliver a second electric current to one or more auxiliary systems;
   at least one power switch configured to independently connect or disconnect the power output(s);
   a plurality of sensors configured to generate data describing the vehicle electrical system;
   a processor connected to the plurality of sensors and configured to interpret the data generated by the plurality of sensors, wherein the processor is further configured to control the power switch(es) based on the data generated by the plurality of sensors and further based on at least one threshold received via a communications interface.

2. The power control device of claim 1, wherein the at least one power output comprises a plurality of power outputs, and wherein the one or more auxiliary systems comprise a plurality of auxiliary systems, and wherein the at least one power switch comprises a plurality of power switches.

3. The power control device of claim 1, wherein the plurality of sensors includes at least one of the following sensors: a temperature sensor, a voltage sensor, and a current sensor.

4. The power control device of claim 1, wherein the at least one power input is connected to a vehicle battery.

5. The power control device of claim 1, further comprising a communications interface.

6. The power control device of claim 5, wherein the communications interface comprises a wireless communications device.

7. The power control device of claim 1, wherein each of the at least two power switches corresponds to at least one of the plurality of power outputs.

8. A power control system for a vehicle, comprising:
   a power control device connected to a vehicle electrical system;
   at least one auxiliary system connected to the vehicle electrical system via the power control device;
   wherein the power control device comprises:
   a processor;
   a plurality of sensors configured to measure at least one performance characteristic of the vehicle electrical system;
   at least one power switch corresponding to the at least one auxiliary system, wherein each power switch is configured to connect or disconnect an auxiliary system from the vehicle electrical system based on a determination of whether the at least one performance characteristic meets at least one threshold; and
   a communications interface, wherein the at least one threshold is received via the communications interface.

9. The power control system of claim 8, wherein the at least one auxiliary system comprises a plurality of auxiliary systems, and wherein the at least one power switch comprises a plurality of power switches.

10. The power control system of claim 8, wherein the communications interface operates by communicating via a protocol that is one of a group consisting of: USB, RS232, RS485, IIC, SPI, Ethernet, Wi-Fi, and Bluetooth.

11. The power control system of claim 8, further comprising a host computer connected to the power control device, wherein the host computer is configured to allow a user to change a set of parameters that are used by the processor to determine when to operate one or more of the plurality of power switches.

12. The power control system of claim 11, wherein the host computer is configured to communicate with a guest computer at a remote location, wherein the guest computer is configured to allow a user to change a set of parameters that are used by the processor to determine when to operate one or more of the plurality of power switches.

13. The power control system of claim 11, further comprising a user interface connected to the host computer.

14. The power control system of claim 8, further comprising a user interface connected to the power control device.

15. A method for managing power distribution in a vehicle electrical system connected to at least one auxiliary system, the method comprising the steps of:
   (a) connecting the auxiliary system(s) to the vehicle electrical system by way of a power control device;
   (b) measuring at least one performance characteristic of the vehicle electrical system;
   (c) for each auxiliary system, determining at least one threshold with respect to the at least one performance characteristic; and
   (d) disconnecting an auxiliary system from the vehicle electrical system when the at least one performance characteristic meets the at least one threshold for the respective auxiliary system.

16. The method of claim 15, wherein the at least one auxiliary system comprises a plurality of auxiliary systems.

17. The method of claim 15, wherein the power control device contains at least two switches for controlling the connection between the auxiliary system(s) and the vehicle electrical system.

18. The method of claim 15, wherein the at least one threshold comprises an upper limit threshold and a lower limit threshold.

19. The method of claim 15, wherein the at least one threshold comprises at least one critical threshold value and at least one non-critical threshold value; wherein the step (d) of disconnecting an auxiliary system is performed without a timer when the critical threshold value has been met; and wherein the step (d) of disconnecting an auxiliary system comprises, when the non-critical threshold value is met, initiating a shutdown timer, at the expiration of which the respective auxiliary system is disconnected from the vehicle electrical system.

20. The method of claim 19, wherein step (c) further comprises determining the duration of the shutdown timer associated with each of the at least one threshold for each auxiliary system.

21. The method of claim 19, further comprising the steps of:
continuing to measure the at least one performance characteristic for the duration of the shutdown timer; and
discontinuing the shutdown timer and restoring the connection between the respective auxiliary system and the vehicle electrical system when the non-critical threshold value is no longer met by the measured performance characteristic.

22. The method of claim 15, wherein the at least one threshold may be changed by connected to the power control device through a communications interface.

23. The method of claim 15, wherein the step (d) of disconnecting an auxiliary system is preceded by the step of notifying a user that a threshold value has been met and simultaneously providing the user with a decision module wherein the user may enter a command including one or more of: immediately disconnecting the respective auxiliary system from the vehicle electrical system; and temporarily disabling the power control device from disconnecting the respective auxiliary system.

* * * * *